June 15, 1948.  H. J. DE N. McCOLLUM  2,443,262
RAM OPERATED AIRCRAFT HEATER WITH RAM ANTI-ICING MEANS
Original Filed Jan. 15, 1943
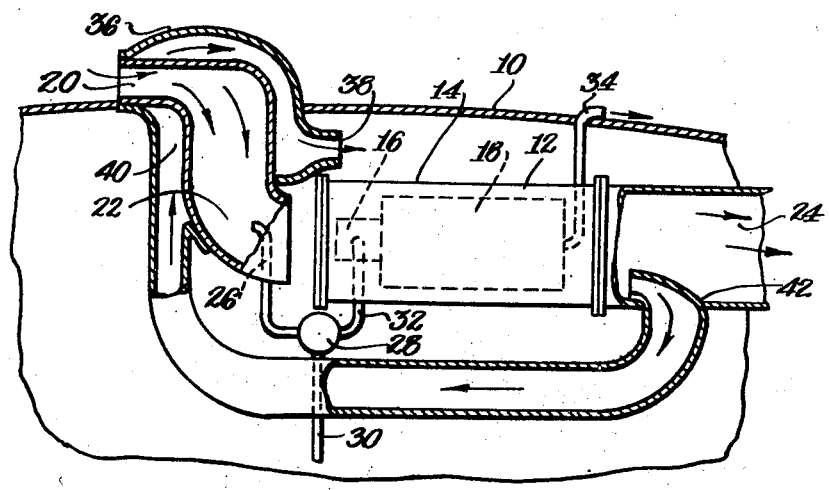
Inventor:
Henry J. De N. McCollum, Deceased,
By Thelma McCollum, Executrix,
By Williams, Bradbury & Hinkle
Attorneys.

Patented June 15, 1948

2,443,262

UNITED STATES PATENT OFFICE 2,443,262

RAM OPERATED AIRCRAFT HEATER WITH RAM ANTI-ICING MEANS

Henry J. De N. McCollum, deceased, late of Chicago, Ill., by Thelma McCollum, executrix, Chicago, Ill., assignor to Stewart-Warner Corporation, Chicago, Ill., a corporation of Virginia Original application January 15, 1943, Serial No. 472,458. Divided and this application November 5, 1945, Serial No. 626,685

2 Claims. (Cl. 126—110)

The present invention relates to aircraft heaters and more particularly to aircraft heaters of the combustion type which receive air for combustion and for ventilation by means of a scoop or ram located in the air stream outside the aircraft. Such rams frequently take the form of an open ended tube or its equivalent which projects through the side wall of the airplane and has its open end facing in a forward direction. Rams also sometimes comprise an opening in the leading edge of the airplane wing. In either case, the dynamic effect of the airplane moving through the air at high speed creates a static pressure within the ram and connected duct work which causes a flow of air through the heater and to the space to be heated. Sometimes the space to be heated comprises the cabin of the aircraft while in other heating systems the hot ventilating air is distributed into a double skin arrangement over the leading edge of the wings or tail surfaces to raise the surface temperature sufficiently above the freezing point, so that ice cannot form thereon.

The principal object of the present invention is to provide a novel heating system of the above type which cannot be rendered inoperative by icing conditions in the vicinity of the aircraft.

Other objects and advantanges will become apparent from the following description of a preferred embodiment of my invention which is illustrated in the accompanying drawing wherein a single figure diagrammatically illustrates an arrangement embodying features of the invention.

The numeral 10 indicates the side wall or skin surface of an aircraft wing or fuselage within which a combustion heater 12 is located. This heater may be of the type more fully illustrated and described in the copending application of Henry J. De N. McCollum bearing Serial No. 472,458 and filed January 15, 1943, now Patent No. 2,427,221 issued Sept. 9, 1947, for Aircraft heating apparatus, of which this application is a division. Application Serial No. 472,458 is in part a continuation of a previously filed and now abandoned application of Henry J. De N. McCollum bearing Serial No. 373,751 filed January 9, 1941, for an invention entitled "Heating apparatus."

The heater 12 comprises an outer shell or casing 14 through which ventilating air can flow. Within the casing the heater is provided at one end with a burner 16 in which a combustible mixture of liquid fuel and air is burned, such that the hot products of combustion empty into a heat exchanger portion 18 also located within the shell 12. Thus ventilating air flowing through the casing 14 removes heat from the heat exchanger 18 with the result that the ventilating air issuing from the downstream end of the heater is considerably elevated in temperature.

The heater 18 is supplied with ventilating air by means of a scoop or ram 20 which comprises an open mouthed tube with the opening facing in the direction of flight. This tube extends generally backwardly and thence inwardly where it is connected with a duct 22 leading to the inlet end of the heater. The downstream end of the heater is similarily connected to a duct 24 which conveys the hot air to the space to be heated.

A combustible mixture is supplied to the burner 16 by a combustion air pipe 26 which opens into the duct 22 upstream of the heater and which has its opposite end connected to a balanced carburetor 28 connected to a source of liquid fuel, for instance, the ordinary engine fuel, by way of a pipe 30. Within the carburetor 28 the combustion air is mixed with the liquid fuel to form a combustible mixture which is supplied to the burner 16 by way of a mixture tube 32. Although in the interest of clarity of illustration no means is shown for igniting the combustible mixture in the burner 16, such details of heater construction can be learned by consulting the previously referred to copending application, Serial No. 472,458, and the patents and other applications referred to in that application. The hot products of combustion pass from the burner 16 into the previously referred to heat exchanger 18 and ultimately are returned to the air stream by way of an exhaust pipe 34 which projects through the wall 10 of the airplane and opens rearwardly of the aircraft.

The ram 20 is provided with a sheet metal jacket 36 which is welded around the open end of the ram 20 and which extends generally rearwardly around the ram tube in spaced relation thereto and has its rearward end open as at 38 within the interior of the aircraft. The forward portion of this jacket is connected to a hot air tube 40 which extends inwardly through the skin and thence generally parallel to the heater and at its rearward end extends into the duct 24 so as to form a ram 42 to receive hot ventilating air.

When the heater is in operation, ventilating air flows inwardly at the scoop as indicated by the arrows, flows rearwardly to the heater casing 14 at its inlet end. The air then passes through the heater where its temperature is raised by the heat exchanger 18. Ultimately it reaches the space to be heated through the duct 24. A portion of this hot air is diverted by means of the connection 42 and flows through the hot air tube 40 to the space within the jacket 36. This heats the jacket 36 and also serves to heat the ram 20 so as to raise the temperature of their surfaces above the icing point under all conditions of operation.

The temperature of the air leaving the jacket 36 is considerably reduced since it loses heat to the ram 20 and jacket 36. As a rule, however, it is still sufficiently warm to be useful for heating purposes and therefore it is brought back into the aircraft and discharged at the opening 38. If preferred, however, the open end can be located outside the aircraft wall 10, so that the air after heating the scoop and jacket 36 exhausts directly to the atmosphere.

Having described the invention, what is claimed as new and useful and desired to be secured by Letters Patent of the United States is:

1. In an airplane, a heating system having means forming a combustion chamber and a heat exchanger, means including an opening to the atmosphere directed forwardly of the airplane to supply combustion air to said chamber and to supply ventilating air to said heat exchanger, a jacket around and forming an air passage adjacent a portion of said means, ventilating air duct means connected to the outlet of said heat exchanger for conveying heated air therefrom to a space to be heated, and means diverting to said jacket a portion of the heated air flowing through said duct.

2. In an airplane, a heating system having means forming a combustion chamber and a heat exchanger connected to receive products of combustion therefrom, means including an opening to the atmosphere directed forwardly of the airplane to supply combustion air to said chamber and to supply ventilating air to said heat exchanger, a jacket around and forming an air passage adjacent a portion of said means, ventilating air duct means connected to the outlet of said heat exchanger for conveying a portion of the heated air therefrom to a space to be heated, and conduit means including said jacket for conveying another portion of the heated air flowing through said duct to the space to be heated.

THELMA McCOLLUM,
*Executrix of the Last Will and Testament of Henry J. De N. McCollum, Deceased.*

REFERENCES CITED

The following references are of record in the file of this patent:

UNITED STATES PATENTS

| Number | Name | Date |
| --- | --- | --- |
| 286,341 | Spear | Oct. 9, 1883 |
| 1,562,663 | Strong | Nov. 24, 1925 |

Certificate of Correction

Patent No. 2,443,262.  June 15, 1948.

HENRY J. DE N. McCOLLUM, DECEASED, BY THELMA McCOLLUM, EXECUTRIX

It is hereby certified that error appears in the above numbered patent requiring correction as follows: In the drawing, duct 22 should be shown connected to the flange of the heater casing 14; and that the said Letters Patent should be read with this correction therein that the same may conform to the record of the case in the Patent Office.

Signed and sealed this 19th day of October, A. D. 1948.

[SEAL]

THOMAS F. MURPHY,
*Assistant Commissioner of Patents.*